United States Patent Office.

THOMAS TAYLOR, OF WASHINGTON, DISTRICT OF COLUMBIA.

Letters Patent No. 61,641, dated January 29, 1867.

IMPROVEMENT IN ELASTIC MOULDS.

*The Schedule referred to in these Letters Patent and making part of the same.*

TO ALL WHOM IT MAY CONCERN:

Be it known that I, THOMAS TAYLOR, of the city and county of Washington, in the District of Columbia, have invented a new and improved Elastic Mould; and I do hereby declare that the following is a full and exact description thereof.

The nature of my invention consists in making my mould of such material or composition as to suit it especially to undercut work, thus saving time, expense, number of pieces, &c. When casting plastic substances, such as plaster of Paris, wax, &c., it is sometimes desirable to use elastic moulds, especially when undercut work has to be multiplied. A composition of glue and wax, glue and sugar, and other compounds, has been employed, and frequently gelatines, in a pure condition; but it has been found in practice that such moulds are easily destroyed by water and low degrees of heat.

To avoid this general objection, I take rubber which has been properly prepared for vulcanization, and place it over a metallic pattern, and by means of back and front metal moulds, plates, or fixtures, the pattern and rubber compound is securely enclosed, pressure being applied to the external surfaces to force the composition into the undercutting, in this way taking a perfect impression of the pattern. In this condition it is subjected to sufficient degree of heat in the usual well-known manner. When the rubber is removed it is fit for use, and may be employed for casting plastic objects, cements, soap, wax, as well as for electrotyping purposes, and even fusible metals which melt at a low temperature. For works of art, much undercut, I generally make incisions in the rubber compound or mould at the undercut points, so that a cast of plaster or wax may be easily removed from the mould without breaking it. I generally use what is termed a back mould, of plaster or other suitable material, to hold the rubber mould in position and keep the parts together whilst I pour any plastic substance into the mould. In making casts from rubber moulds care must be taken not to use any form of oil, as it will soften the rubber and render it useless. I use instead thereof a little moisture or alcohol previous to pouring the plastic material into the moulds, in order to prevent it from adhering to the rubber mould.

Having thus described my invention, what I claim as new, and desire to secure by Letters Patent of the United States, is—

The use and application of vulcanized rubber for the purpose herein set forth.

THOMAS TAYLOR.

Witnesses:
   S. S. FAHNESTOCK,
   JOHN S. HOLLINGSHEAD.